(12) United States Patent
Hayashi

(10) Patent No.: US 6,438,985 B1
(45) Date of Patent: Aug. 27, 2002

(54) AIR-CONDITIONING UNIT

(75) Inventor: Hirohito Hayashi, Kariya (JP)

(73) Assignee: Kabushiki Kaisha Toyoda Jidoshokki Seisakusho, Kariya (JP)

(*) Notice: Subject to any disclaimer, the term of this patent is extended or adjusted under 35 U.S.C. 154(b) by 0 days.

(21) Appl. No.: 09/828,263

(22) Filed: Apr. 6, 2001

(30) Foreign Application Priority Data

Apr. 7, 2000 (JP) .......................................... 2000-106491

(51) Int. Cl.⁷ .............................................. F25D 19/00
(52) U.S. Cl. ........................................... 62/298; 62/244
(58) Field of Search ........................... 62/298, 77, 244, 62/513, 335, 259.1

(56) References Cited

U.S. PATENT DOCUMENTS 6,148,630 A * 11/2000 Saccone .................... 62/259.1

FOREIGN PATENT DOCUMENTS

| JP | 8-216671 | 8/1996 | ............ B60H/1/32 |
| JP | 10141693 A | * 5/1998 | |
| JP | 10311621 A | * 11/1998 | |

* cited by examiner

Primary Examiner—Chen-wen Jiang
(74) Attorney, Agent, or Firm—Morgan & Finnegan, LLP

(57) ABSTRACT

An air-conditioning unit comprises a compressor component for compressing a refrigerant, a condenser component for condensing the refrigerant, and an evaporator component for evaporating the refrigerant. At least two of the compressor, the condenser and the evaporator components is assembled integrally. This prevents with certainty leakage of the refrigerant that circulates through the air-conditioning unit.

8 Claims, 5 Drawing Sheets

AIR-CONDITIONING UNIT

BACKGROUND OF THE INVENTION

The present invention relates to an air-conditioning unit.

Recently, various low-pollution vehicles have been developed as a response to environmental problems. Electric vehicles, one type of low-pollution vehicles, have been developed actively and put to practical use. Each electric vehicle runs a drive motor using a battery as the energy source. A motor-driven compressor, which uses an electric motor as the drive source, is used as a compressor for an air-conditioning systems in electric vehicles.

For example, Japanese Unexamined Patent Publication (KOKAI) No. Hei 8-216671 discloses an air-conditioning system that uses a motor-driven compressor as shown in FIG. 7.

A case 52 of an air-conditioning system 51 houses a condenser 53, an evaporator 54 and a motor-driven compressor 55. The case 52 is divided into first, second and third chambers 60, 70 and 80. The first chamber 60 accommodates the condenser 53, the second chamber 70 accommodates the evaporator 54, and the third chamber 80 accommodates a horizontal type motor-driven compressor 55 and a four-way valve 56. The condenser 53, the evaporator 54, the motor-driven compressor 55 and the four-way valve 56 are connected together by pipes 57a to 57d, which form a passage for a refrigerant gas. A motor-driven expansion valve 58 is provided on the pipe 57c that connects the condenser 53 to the evaporator 54.

In consideration of environmental problems, carbon dioxide has recently been used as a refrigerant. In this case, the pressure inside each of the pipes 57a–57d is higher than that where chlorofluorocarbon, or freon, is used as a refrigerant. This causes refrigerant gas to leak through the joint sections of the pipes 57a–57d. When the pipes are long, the probability of cracks and other kinds of damage increases. Such damages including cracks will result in leakage of the refrigerant gas.

SUMMARY OF THE INVENTION

Accordingly, it is an object of the present invention to provide a compact air-conditioning unit that prevents with certainty leakage of the refrigerant that circulates through the air-conditioning unit.

To achieve the above objective, the present invention provides an air-conditioning unit. The air-conditioning unit comprises a compressor component for compressing a refrigerant, a condenser component for condensing the refrigerant, and an evaporator component for evaporating the refrigerant. At least two of the compressor, the condenser and the evaporator components are assembled integrally.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of an air-conditioning unit 1 of a vehicle air-conditioning system will be described with reference to FIGS. 1 and 2.

Figure 1:
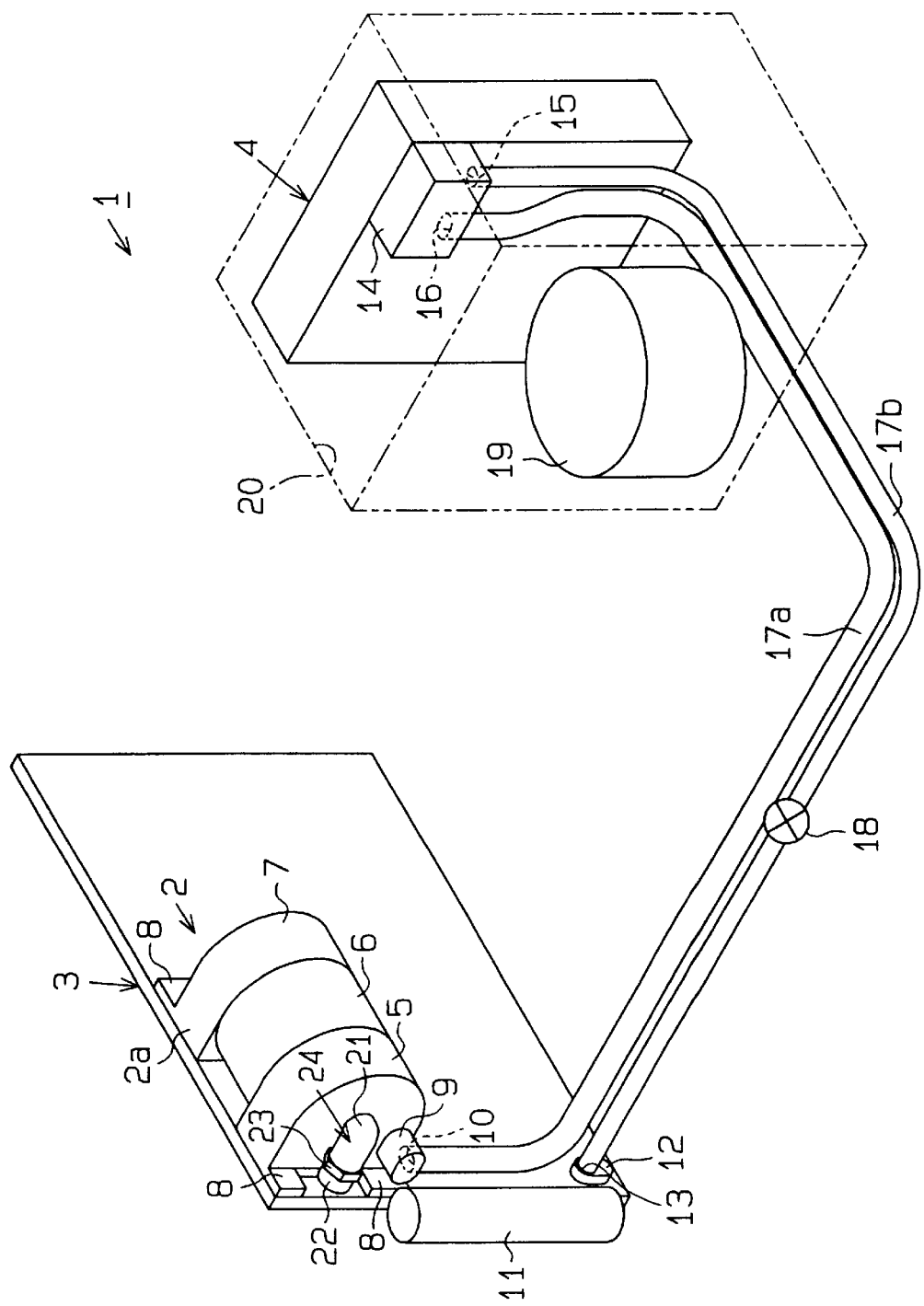
FIG. 1 is a perspective view of an air-conditioning unit according to a first embodiment of the present invention.

As shown in FIG. 1, the air-conditioning unit 1 is installed in, for example, the engine compartment of an automobile. The air-conditioning unit 1 has a motor-driven compressor 2 which compresses refrigerant, a condenser 3, which condenses the refrigerant, and an evaporator 4, which evaporates the refrigerant. The motor-driven compressor 2 has a compressing mechanism 5, a motor 6 and a drive circuit 7. The drive circuit 7 controls the rotational speed of the motor 6. The discharge capacity of the compressing mechanism 5 is changed in accordance with the rotational speed of the motor 6. The discharged refrigerant flows from the motor-driven compressor 2 to the condenser 3 and from the condenser 3 to the evaporator 4. Then the refrigerant returns to the motor-driven compressor 2.

Four brackets 8 (three shown in FIG. 1) are integrally formed on a housing 2a of the motor-driven compressor 2. The motor-driven compressor 2 is attached to the condenser 3 by the brackets 8 by unillustrated bolts. A first connector 9, where a first pipe 17a, including a pipe and hose, is attached, is provided on one end surface of the compressing mechanism 5. Formed in the first connector 9 is an inlet port 10, which communicates with a suction chamber (not shown) in the compressing mechanism 5.

The condenser 3 is provided with a gas-liquid separator 11. The condenser 3 is also provided with a second connector 12, where a second pipe 17b is attached. Formed in the second connector 12 is a discharge port 13, from which refrigerant that has been separated by the gas-liquid separator 11 after condensation in the condenser 3 is discharged.

The evaporator 4 is provided with a third connector 14, where end portions of the pipes 17a and 17b are attached. Formed in the third connector 14 are an inlet port 15, from which the refrigerant enters, and a exhaust port 16, from which the refrigerant gas evaporated by the evaporator 4 is exhausted. The discharge port 13 of the condenser 3 and the inlet port 15 of the evaporator 4 are connected together by the second pipe 17b. The exhaust port 16 of the evaporator 4 and the inlet port 10 of the motor-driven compressor 2 are connected together by the first pipe 17a. An expansion valve 18 is provided on the second pipe 17b. A blower fan 19 is located near the evaporator 4. The blower fan 19 and the evaporator 4 are located in a duct 20.

A discharge pipe section 21 is integrally formed on one end surface of the compressing mechanism 5. The discharge pipe section 21 communicates with a discharge chamber (not shown) in the compressing mechanism 5. The condenser 3 has an inlet pipe section 22 integrally formed at a position corresponding to the discharge pipe section 21. The discharge and inlet pipe sections 21 and 22 are connected together by a nipple 23. The discharge and inlet sections 21 and 22 and the nipple 23 form a passage 24. The motor-driven compressor 2 is connected to the condenser 3 via the passage 24.

Figure 2:
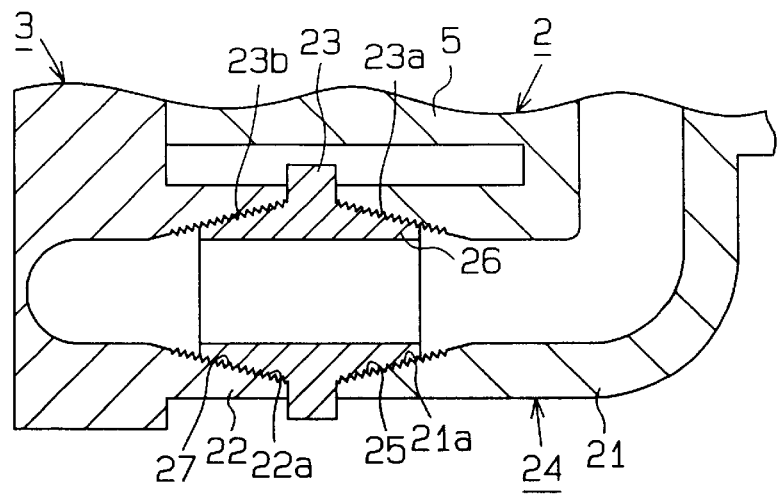
FIG. 2 is a partial cross-sectional view showing a passage that connects a motor-driven compressor to a condenser.

FIG. 2 shows the cross section of the passage 24 that connects the motor-driven compressor 2 to the condenser 3. Formed on the inner surfaces of the distal end portions of the pipe sections 21 and 22 are internal threads 21a and 22a, which are threaded in opposite directions. Formed on the outer surfaces of the ends of the nipple 23 are external threads 23a and 23b, which are respectively threaded to the internal screws 21a and 22a. When the external threads 23a and 23b of the nipple 23 are threaded into their respective internal screws 21a and 22a, the two pipe sections 21 and 22 are connected together by the nipple 23. A discharge port 25 of the pipe section 21 is connected to an inlet port 27 of the pipe section 22 via a communication hole 26 formed in the nipple 23.

Since the pipe sections 21 and 22 are connected together by the nipple 23, this embodiment does not use a pipe or a hose. Therefore, the joint in the passage 24 where high pressure refrigerant gas, discharged from the motor-driven compressor 2 enters the condenser 3 is essentially nothing more than the nipple 23.

This embodiment has the following advantages.

Because the motor-driven compressor 2 is integrally attached to the condenser 3, the distance between the inlet port 10 of the motor-driven compressor 2 and the discharge port 13 of the condenser 3 is short. It is therefore possible to employ a structure in which both pipe sections 21 and 22 extend respectively from the motor-driven compressor 2 and the condenser 3 so that the pipe sections 21 and 22 are directly coupled together.

Since both pipe sections 21 and 22 are directly coupled together, damage including cracks are reduced significantly compared with the case where a pipe or a hose is used. According to the illustrated embodiment, there is only one joint. If a pipe or a hose is required, two joints, one at each end of the hose or pipe, are required. This reliably prevent leakage of the refrigerant gas.

The unified motor-driven compressor 2 and condenser 3 can be treated as a single component. This makes it easier to install the air-conditioning unit 1 in a vehicle and reduces the installation space required for the air-conditioning unit 1.

The passage 24 where the refrigerant gas under high pressure, discharged from the motor-driven compressor 2, travels is not joined to a pipe. It is therefore possible to prevent refrigerant leakage where refrigerant leakage is most likely to occur. When the present invention is used in the air-conditioning unit 1, which uses carbon dioxide as the refrigerant, particularly, refrigerant leakage can be reliably prevented.

The air-conditioning unit 1 according to a second embodiment of the present invention will be discussed below with reference to FIGS. 3 to 4B. This embodiment differs from the embodiment illustrated in FIGS. 1 and 2 in that the motor-driven compressor 2 is attached to the condenser 3 and the evaporator 4 to provide an integral air-conditioning unit 1 and is the same as the latter embodiment in other respects. To avoid a redundancy, like or same reference symbols are given to those components that are like or the same as corresponding components of the first embodiment.

Figure 3:
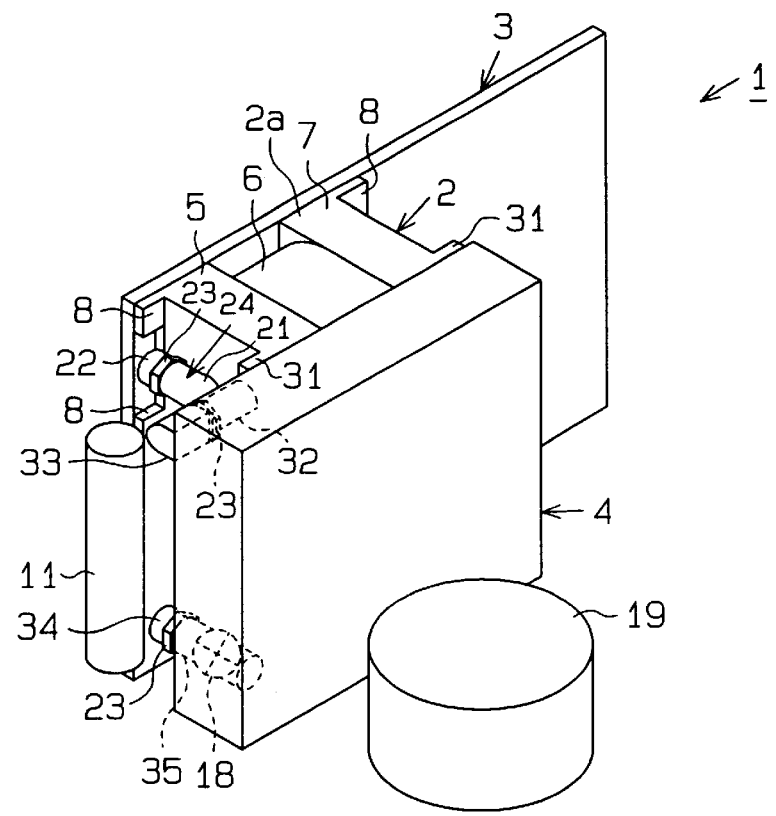
FIG. 3 is a perspective view of an air-conditioning unit according to a second embodiment of the present invention.

As shown in FIG. 3, the motor-driven compressor 2 is attached integrally to the condenser 3 via the brackets 8 by unillustrated bolts. The motor-driven compressor 2 is connected to the condenser 3 by the passage 24, which is formed by directly coupling the pipe sections 21 and 22 to each other with the nipple 23. The housing 2a of the motor-driven compressor 2 has four second brackets 31 (only two are shown in FIG. 3) formed at positions corresponding to the first brackets 8. The motor-driven compressor 2 is attached to the evaporator 4 by the four second brackets 31 by unillustrated bolts. The motor-driven compressor 2, the condenser 3 and the evaporator 4 are therefore unified.

Figure 4A:
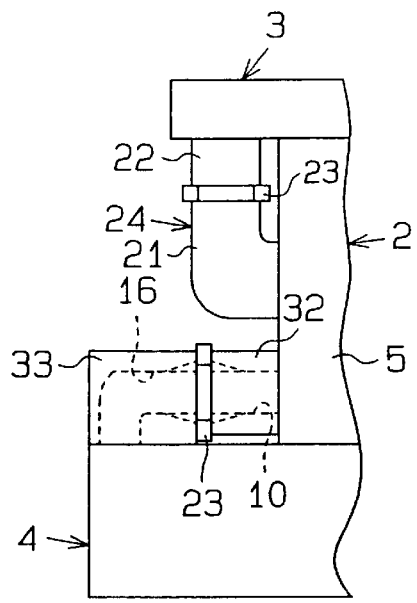
FIG. 4a is a plan view of the section where the motor-driven compressor is connected to an evaporator.

The structure that connects the exhaust port 16 of the evaporator 4 to the inlet port 10 of the motor-driven compressor 2 is essentially identical to the structure that connects the discharge port 13 of the condenser 3 to the inlet port 10 of the motor-driven compressor 2 in the embodiment illustrated in FIGS. 1 and 2. Specifically, as shown in FIG. 4(a), a downstream pipe section 32 is integrally formed on one end surface of the compressing mechanism 5 of the motor-driven compressor 2. An upstream pipe section 33 is integrally formed on one side of the evaporator 4 at the position that corresponds to the downstream pipe section 32. When the nipple 23 is fastened between the two pipe sections 32 and 33, the inlet port 10 and the exhaust port 16 are connected without using a pipe or hose.

The structure that connects the discharge port 13 of the condenser 3 to the inlet port 15 of the evaporator 4 is likewise essentially the same as the structure that uses the nipple 23. Specifically, as shown in FIG. 4(b), an upstream pipe section 34 is formed on one side of the condenser 3. A downstream pipe section 35 is formed on one side of the evaporator 4 at a position that corresponds to the upstream pipe section 34. When the nipple 23 is fastened between the two pipe sections 34 and 35, the discharge port 13 and the inlet port 15 are connected without using a pipe or a hose. The expansion valve 18 is located in the fourth pipe section 35.

According to this embodiment, like the embodiment shown in FIGS. 1 and 2, the motor-driven compressor 2 and the condenser 3 are connected together without a pipe and refrigerant leakage is prevented. Further, the assembly of the air-conditioning unit 1 is simple and the installation space required for the unit 1 is small.

The unitary assembly of the motor-driven compressor 2, the condenser 3 and the evaporator 4 shorten the distances between all the joint sections. This makes it possible to connect all the motor-driven compressor 2, the condenser 3 and the evaporator 4 without pipes or hoses. This considerably reduces the likelihood of damage, including cracks in the pipes. Since there are only three joints in the air-conditioning unit 1, refrigerant leakage are further prevented. Furthermore, the air-conditioning unit 1 of this embodiment is more compact than that of the embodiment shown in FIGS. 1 and 2, thus requiring a smaller installation space.

The embodiment may be modified as follows.

Figure 5:
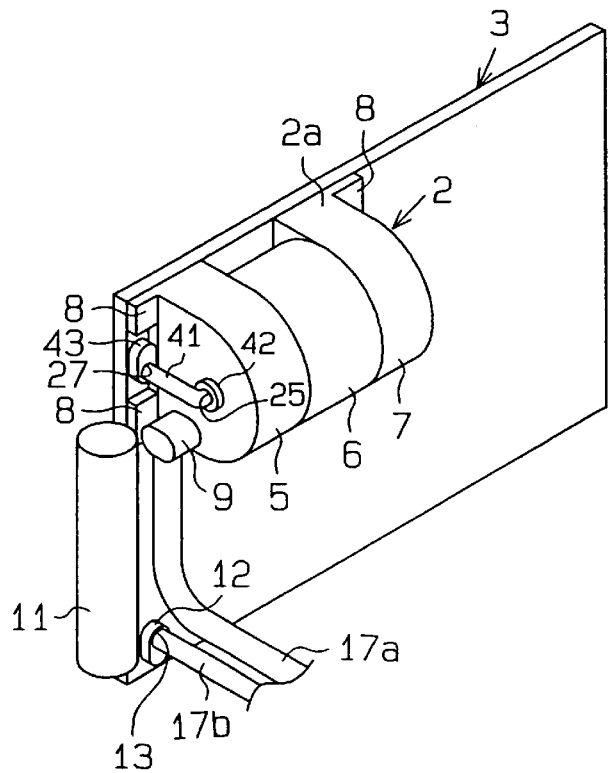
FIG. 5 is a perspective view illustrating a unified assembly of a motor-driven compressor and a condenser according to a third embodiment of the present invention.

For example, the motor-driven compressor 2 and the condenser 3 may be connected by a pipe 41 as in the third embodiment shown in FIG. 5. In this case, the discharge port 25 of a first connector 42 formed on the motor-driven compressor 2 is connected to the inlet port 27 of a second connector 43 formed on the condenser 3 by the pipe 41. The unitary assembly of the motor-driven compressor 2 and the condenser 3 reduces the length of the pipe 41. This reduces the likelihood of damage, including cracks in the pipe 41, thus preventing of refrigerant leakage more reliably.

Figure 6:
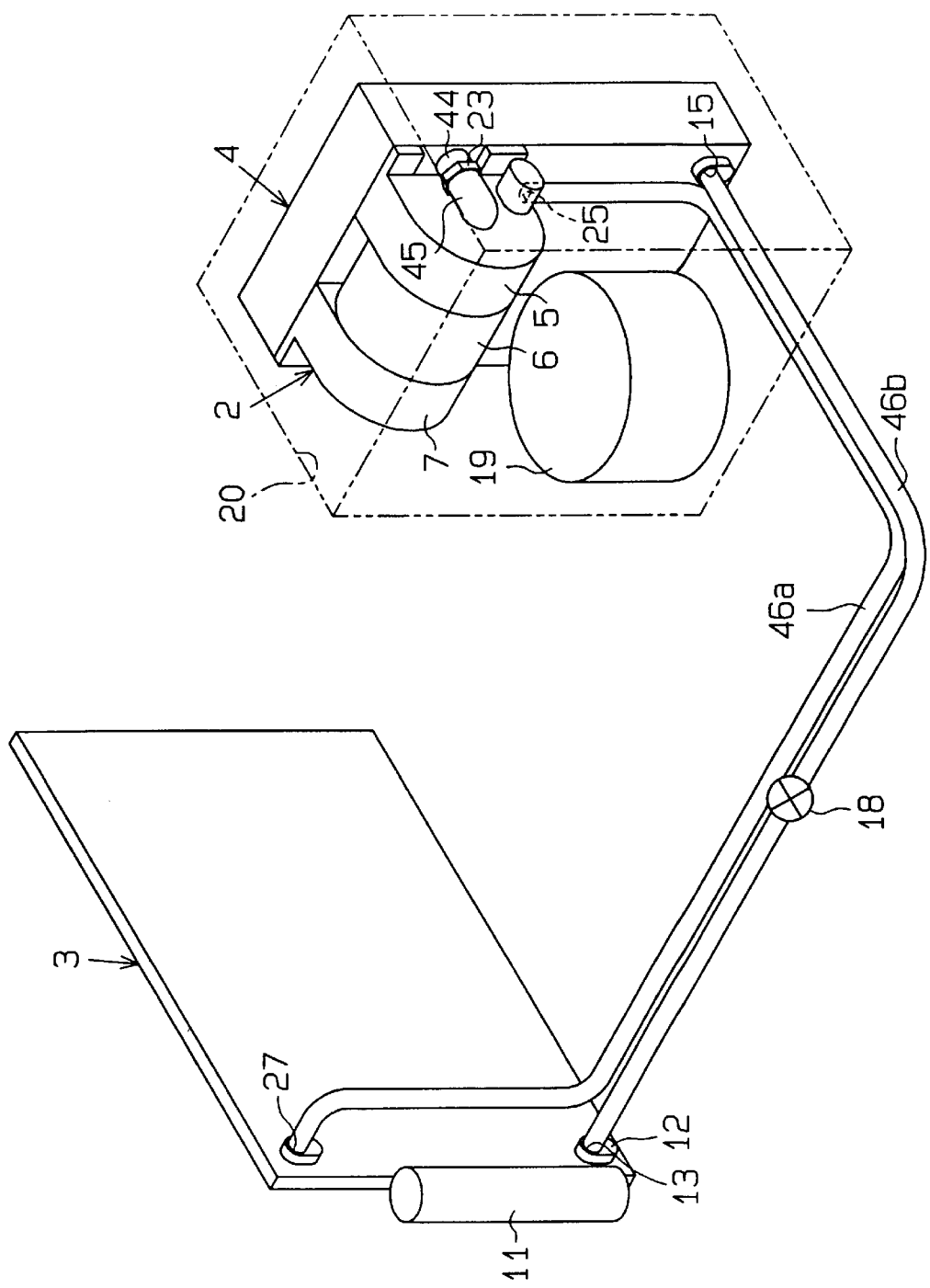
FIG. 6 is a perspective view of an air-conditioning unit according to a fourth embodiment of the present invention.
Figure 7:
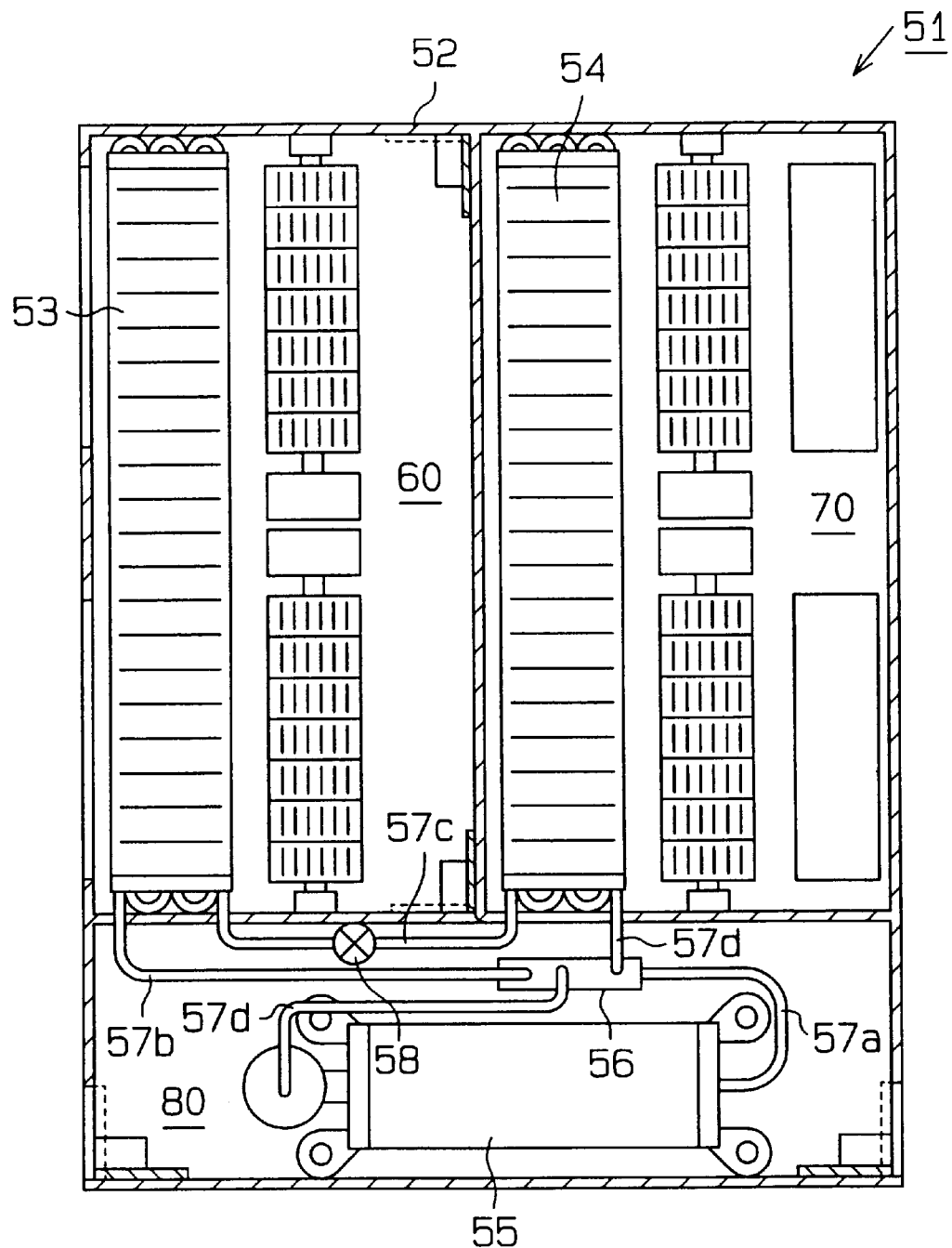
FIG. 7 is a cross-sectional view of a conventional air-conditioning system.

Further, the motor-driven compressor 2 and the evaporator 4 may be assembled integrally, and the inlet port of the motor-driven compressor 2 may be connected to the exhaust port of the evaporator 4 without using a pipe as in a fourth embodiment shown in FIG. 6. In this embodiment, the discharge chamber is provided in the inner portion of the compressing mechanism 5, and the suction chamber is in the outer portion of the compressing mechanism 5. A pipe section 44 extending from one side of the evaporator 4 and a pipe section 45 extending from one end surface of the motor-driven compressor 2 are connected together by the nipple 23. The pipe sections 44 and 45 and the nipple 23 form a passage 47. The discharge port 25 of the motor-driven compressor 2 and the inlet port 27 of the condenser 3 are connected by a pipe 46a, and the discharge port 13 of the condenser 3 and the inlet port 15 of the evaporator 4 are connected by a pipe 46b. This removes the pipe between the motor-driven compressor 2 and the evaporator 4, thus improving the prevention of refrigerant leakage from the refrigerant passage between the motor-driven compressor 2 and the evaporator 4. The inlet port of the motor-driven compressor 2 and the exhaust port of the evaporator 4 may however be connected by a pipe. Because the length of the pipe that connects the exhaust port to the inlet port is shorter in this case too, the prevention of refrigerant leakage from the refrigerant passage between the motor-driven compressor 2 and the condenser 3 is improved.

At the time of connecting the unitary motor-driven compressor 2, condenser 3 and evaporator 4 in the air-conditioning unit 1, a choice can be made between connecting those components 2 to 4 with or without pipes.

The nipple 23 may be omitted. For example, the nipple 23 may be replaced with a structure in which one pipe section is fitted into the other pipe section and a lock nut is fastened on a external screw formed on the outer surface of the outer pipe section.

Figure 4B:
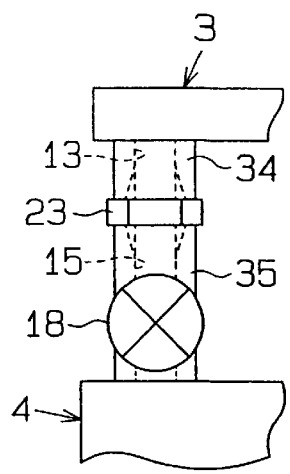
FIG. 4b is a plan view of the section where the condenser is connected to the evaporator.

If the motor-driven compressor 2, the condenser 3 and the evaporator 4 are unitary as in the embodiment shown in FIGS. 3 to 4B, the means of the unification is not limited to the attachment of the components themselves. For example, the condenser 3 to which the motor-driven compressor 2 is attached and the evaporator 4 may be attached to a common support base or a common case.

The position and direction of the attachment of the motor-driven compressor 2 to the condenser 3 are variable as are the position and direction of the attachment of the motor-driven compressor 2 to the evaporator 4.

The compressor is not limited to the motor-driven compressor 2. For example, it is possible to employ a compressor that uses an external power source, such as an engine, as the drive source. Further, a reciprocal type compressor (e.g., a swash-plate type compressor or the like) or a rotary compressor (e.g., a scroll type compressor or the like) may be selected as needed.

The air-conditioning unit 1 of the present invention is not necessarily be installed in a vehicle (automobile), but may be adapted to a building air-conditioning system.

It should be apparent to those skilled in the art that the present invention may be embodied in many other specific forms without departing from the spirit or scope of the invention. Particularly, it should be understood that the invention may be embodied in the following forms.

Therefore, the present examples and embodiments are to be considered as illustrative and not restrictive and the invention is not to be limited to the details given herein, but may be modified within the scope and equivalence of the appended claims.

What is claimed is:

1. An air-conditioning unit comprising:
   a compressor component for compressing a refrigerant;
   a condenser component for condensing the refrigerant; and
   an evaporator component for evaporating the refrigerant,
   at least two of the compressor, the condenser and the evaporator components being assembled integrally, wherein the integrally assembled components are attached without a pipe.

2. The air-conditioning unit according to claim 1, wherein the compressor is attached integrally to the condenser.

3. The air-conditioning unit according to claim 2, wherein the compressor is attached integrally to the condenser without a pipe.

4. The air-conditioning unit according to claim 1, wherein the compressor, the condenser and the evaporator are assembled integrally.

5. An air-conditioning unit comprising:
   a compressor component for compressing a refrigerant;
   a condenser component for condensing the refrigerant;
   an evaporator component for evaporating the refrigerant; and
   a passage for connecting at least two of the components, wherein the compressor is attached integrally to the condenser, and wherein the compressor is attached integrally to the condenser without a pipe.

6. The air-conditioning unit according to claim 5, wherein the passage has two pipe sections that are connected together by a nipple.

7. The air-conditioning unit according to claim 6, wherein threads are formed on end portions of the two pipe sections.

8. The air-conditioning unit according to claim 5, wherein the compressor, the condenser and the evaporator are assembled integrally.

* * * * *